3,073,387
METHOD FOR REMOVAL OF LIQUID AND SOLID MATERIALS FROM GAS-WELL BORES
Herbert N. Dunning and C. J. Walker, Bartlesville, Okla., assignors to the United States of America as represented by the Secretary of the Interior
No Drawing. Filed Oct. 22, 1959, Ser. No. 848,167
6 Claims. (Cl. 166—45)
(Granted under Title 35, U.S. Code (1952), sec. 266)

The invention herein described and claimed may be manufactured and used by or for the Government of the United States of America for governmental purposes without the payment of royalties therein or therefor.

This invention relates to a method for removing aqueous liquids and solids from gas wells which produce boh gas and water. It is particularly well adapted for the removal of brines from gas wells in storage projects, and from gas producing wells.

Many gas wells in gas producing or storage reservoirs produce water and/or oil with the gas. These liquids terials that hamper efficient operation. This is particution entirely. In addition, many gas wells contain solids such as rust, clays, drilling muds, and other foreign materials that hamper efficient operation. This is particularly true of old wells and wells in gas storage projects into which large volumes of gas have been pumped. Here, compressor oil finds its way into the well bores and interferes with efficient operation. These materials, and particularly water, sometimes may be removed from the well bore by pumping, siphons, or other mechanical means. Such methods are expensive, time consuming, the equipment has a limited period of usefulness, and often a large amount of gas is wasted in their operation.

It is an object of this invention to remove water from a gas well by injecting foaming agents therein.

A further object of this invention is to remove solid debris and/or oily materials from a water-containing gas well by adding thereto a foaming agent.

A further object of this invention is to provide a method for removing solid and/or oily contaminant material from the walls of an elongated vessel by injecting a foaming agent therein, inducing foaming so as to cause the foam to overflow and removing the foam and the contaminant material carried thereby.

Further objects will become apparent from a consideration of the following specification and claims.

In one modification, chemical additives which cause foaming are introduced into the aqueous liquid in a gas well bore. Even small amounts of gas, escaping from the formation into the well bore, rapidly cause foaming. This foam contains the aqueous liquid and a large amount of entrained gas. Thereby, the liquid column is lightened to such an extent that even small reservoir pressures are able to lift the resultant light foam column to the surface where it is expelled from the well. The foam produced has a high bulk viscosity and bubble plasticity which enables it to act as a flotation medium in removing solid products from the well bore and function as an efficient cleansing agent. These properties may be employed for cleaning pipes or tanks, wherein a foam is generated and caused to overflow, thereby sweeping out debris and solid material. In the embodiment described herein, it should be noted that the casing in a well bore may be considered as a very elongated vessel. Many of the foaming agents are powerful detergents, so that a highly effective cleansing of oily material from the well is accomplished.

Numerous compounds are available commercially which foam readily in water or brines. Nonionic surface acting agents or detergents are generally favored because they do not react with the minerals in gas field brines and are efficient cleansing agents. Materials found useful are, polyoxyethylated alkyl phenols such as Triton X-102 and Triton X-165 marketed by Rohm and Haas Company; alkyl aryl polyethylene glycol ether detergents such as Igepals marketed by General Aniline and Film Corporation, reaction products of ethylene oxide with fatty acid amides, marketed as Ethomid by Armour & Company; condensation products of ethylene oxide with a proplyene oxide-propylene glycol reaction product, marketed as Pluronics by Wyandotte Chemical Corp.

This list is merely exemplary and does not exhaust the possible classes of compounds which may be employed. It will be obvious to one skilled in the art which detergent compounds appear to be promising and are suitable for use. Other foaming agents which may be employed are licorice extracts and protein hydrolyzates. In specific cases, surface acting agents which are anionic, such as Triton QS-15, or cationic, such as the Arquads, marketed by Armour and Company, may be found effective.

In use the foaming agent may be diluted with water, brine, or organic solvents for introduction into the well bore. Alcohol is preferred in most cases because of its ready availability and its viscosity decreasing and antifreeze properties. Proportions of foaming agent and solvent may be varied within a broad range, so long as the viscosity of the mixture be kept low enough to enable it to flow readily down the well bore. The solvent may vary from 10 to 90 percent, with a range of 50 to 70 preferred in most cases.

Enough foaming agent should be introduced to produce a strong foam in the bore. At least about 0.2% solution has been found to be satisfactory in most instances. In use, the alcohol solution of foaming agent is introduced into the well and washed down with water.

In order to mix the agent with water to be removed, the well may be "rocked" if it contains tubing or a siphon. If it contains only casing, mixing may take place during a shut-in period or a period of very low gas production of an hour or more. It is preferable to introduce the agent into the annulus if water is to be produced from tubing in a tubed well, or vice versa, to insure that the foaming agent reaches the bottom of the water column.

In one test a polyoxyethylated alkyl phenol in alcohol solution was added to a gas well that contained so much water its gas production had virtually ceased. The well was shut in to allow the detergent time to mix with the water. A few minutes after opening, the well began to produce water and gas in the form of a foam. In less than an hour the well had cleared itself of brine in the bore hole and tests showed that it had a capacity tu produce gas at a rate of three times that observed before treatment.

Such foams are very efficient in removing solid material from bore holes. In one test 10 percent silicious solid materials were removed from the water separating from the foam. The addition of inorganic alkaline compounds such as alkali metal polyphosphates, e.g., sodium hexametaphosphate (Calgon) to the foaming agent has been found useful where such materials are encountered.

The following examples, which it is to be understood are non-limiting, illustrates the method. In the examples the foaming agent used was Triton X-102, mixed with an equal volume of alcohol.

*Example 1*

Well A, Hugoton field, Sherman County, Texas, was completed in 1950 at a total depth of 3,158 feet with 7-inch casing set at a depth of 3,041 feet and a 6-inch liner from 3,018 and 3,158 feet. The gas-producing zone extends from 3,041 to 3,158 feet. A liquid-level measurement showed the water level at a depth of 2,843 feet, or a water column of 315 feet.

At this time, a back-pressure test showed a $Q_{100}$ (proctivity at a difference in squared pressures of 100,000) lue of 45 M c.f.d.[1] After these tests, 10 gallons of the aming agent was lubricated into the well, preceded and llowed by 5 gallons of water. A few minutes of gas oduction showed that the foaming agent was not adeiately mixed with the well-bore fluids. Therefore, an lditional 5 gallons of foaming agent was injected and e well shut in overnight.

The well was opened to the atmosphere at 9:15 a.m. id by 3 p.m. it had effectively been cleared of water id the liquid level was gaged at a depth of 3,088 feet.

The $Q_{100}$ value of the well was then gaged at 70 M f.d. A repetition of the test a week later, after some rater had accumulated in the bore, lowered the water vel to 3,090 feet. The results of these tests indicate ie 68 foot water column remaining in the well is below ie gas-producing zone. This treatment removed 245 eet (about 9 bbl.) of water from a 7-inch casing, at a epth of about 3,000 feet with a reservoir pressure of bout 300 p.s.i.

While the example shows treatment by a batch method, he system may be employed for continuous water renoval. In this case, the foaming agent is introduced ontinuously by a chemical feeder, foam is removed from he well and fed to a foam breaker, and the liquid is eparated from the gas. Any of the commercially available separators may be employed for this purpose.

*Example 2*

Foaming agent was pumped continuously into a test well in the Longton Storage Pool, Chautauqua County, Kansas, at a rate of 1.5 quarts per day, after an initial injection of two gallons. Foam was removed and broken with Dow-Corning Antofoam-B, a silicon antifoaming agent marketed by Dow-Corning Corporation. The water and gas separated were measured and the gas sent to pipe line.

Before the test, the gas production of the well was 30 M c.f.d. After the initial 2 gallon Triton X-102 injection, 40 gallons of water were produced, and the rate of flow rose to 50 M c.f.d. The continuous feeding of detergent was carried out for three weeks. During this time gas production was more than 50 M c.f.d., water production averaged 10 gallons/day, and the antifoam used averaged 0.003 pound/day. Water production ceased two days after detergent feeding stopped, and the gas production began to decline.

It is obvious that the above described invention is susceptible of various changes and modifications without departing from the spirit and scope thereof.

We claim:

1. A method for treating gas wells containing water which comprises, feeding a dissolved foaming agent to the water in the well whereby the water and foaming agent are mixed, said mixing producing an aqueous solution of said foaming agent within the well, shutting the well to stop gas flow from the well to permit the gas pressure to build up, and then opening the well, whereby a foam comprising water and gas and characterized by high bulk viscosity and bubble plasticity, flows from the well.

2. The method of claim 1, wherein the foaming agent comprises a member of a class consisting of nonionic, anionic and cationic surface acting agents.

3. The method of claim 1, wherein the foaming agent comprises a protein hydrolyzate.

4. The method of claim 1, wherein the foaming agent comprises licorice extract.

5. The method of claim 1, wherein the foaming agent comprises a nonionic detergent and an alkali metal polyphosphate.

6. A continuous method for treating gas wells containing water which comprises continuously feeding a dissolved foaming agent to the water in the well to accomplish a mixture thereof in the water, said intermixing producing an aqueous solution of the foaming agent within the well, whereby the gas flowing through the water in the well bore causes the formation of a column of highly plastic foam, said foam continuously flowing out of the top of the well, removing the foam, adding a foam breaker thereto and recovering gas and water from the foam.

References Cited in the file of this patent

UNITED STATES PATENTS

| | | |
|---|---|---|
| 336,317 | Hitchcock | Feb. 16, 1886 |
| 2,089,035 | Oberlin | Aug. 3, 1937 |
| 2,168,116 | Crites et al. | Aug. 1, 1939 |
| 2,748,867 | Lissant | June 5, 1956 |

OTHER REFERENCES

Murray et al.: "Water Still Poses Tough Problems in Drilling With Air," article in Oil and Gas Journal, June 10, 1957, pages 105 to 112.

"Stearates, Foaming Agents Combat Water in Air or Gas Drilling," article by Randall et al., The Oil and Gas Journal, November 3, 1958, pages 78-83.

---

[1] Walker, C. J., and Dunning, H. N.: "How Gas Storage Wells Behave," Pipeline Engineer, vol. 30, June 1958, p. D-36.

UNITED STATES PATENT OFFICE
CERTIFICATE OF CORRECTION

Patent No. 3,073,387                     January 15, 1963

Herbert N. Dunning et al.

It is hereby certified that error appears in the above numbered patent requiring correction and that the said Letters Patent should read as corrected below.

Column 1, line 16, for "boh" read -- both --; lines 22 and 23, for "terials that hamper efficient operation. This is particution" read -- restrict the well efficiency and often prevent gas product --. column 3, line 34, for "Antofoam-B" read -- Antifoam-B --.

Signed and sealed this 3rd day of September 1963.

(SEAL)
Attest:

ERNEST W. SWIDER
Attesting Officer

DAVID L. LADD
Commissioner of Patents